(12) United States Patent
Loecklin

(10) Patent No.: US 12,730,004 B2
(45) Date of Patent: Sep. 8, 2026

(54) DIFFRACTION GRATING MONOCHROMATOR

(71) Applicant: VIAVI SOLUTIONS INC., Chandler, AZ (US)

(72) Inventor: Eberhard Lothar Loecklin, Reutlingen (DE)

(73) Assignee: VIAVI SOLUTIONS INC., Chandler, AZ (US)

( * ) Notice: Subject to any disclaimer, the term of this patent is extended or adjusted under 35 U.S.C. 154(b) by 515 days.

(21) Appl. No.: 18/358,259

(22) Filed: Jul. 25, 2023

(65) Prior Publication Data

US 2024/0035887 A1 Feb. 1, 2024

Related U.S. Application Data

(60) Provisional application No. 63/393,362, filed on Jul. 29, 2022.

(51) Int. Cl.
*G01J 3/18* (2006.01)
*G01J 3/28* (2006.01)

(52) U.S. Cl.
CPC ......... *G01J 3/18* (2013.01); *G01J 2003/2879* (2013.01)

(58) Field of Classification Search
CPC ........ G01J 2003/1247; G01J 3/18; G01J 3/12; G01J 2003/2879
See application file for complete search history.

(56) References Cited

U.S. PATENT DOCUMENTS 4,664,522 A 5/1987 LeFebre
5,268,737 A 12/1993 Fukuma et al.
(Continued)

FOREIGN PATENT DOCUMENTS

EP 1120637 A2 * 8/2001 ................ G01J 3/28
JP 2010127709 A * 6/2010

OTHER PUBLICATIONS

Osama Terra, "Calibration of grating based optical spectrum analyzers", Sep. 2014 (Year: 2014).*

*Primary Examiner* — Maurice C Smith
(74) *Attorney, Agent, or Firm* — Mannava & Kang, P.C.

(57) ABSTRACT

A monochromator apparatus for an optical spectrum analyzer (OSA) may include a diffraction grating and a sensor. For calibration of the monochromator, an optical signal may be received and a $0^{th}$ order diffracted signal and an angle of the $0^{th}$ order diffracted signal may be detected, where the $0^{th}$ order diffracted signal is obtained by diffracting the optical signal on the diffraction grating. The angle of the $0^{th}$ order diffracted signal may be set as a reference angle and a next order diffracted signal and an angle of the next order diffracted signal detected. A wavelength of the next order diffracted signal may be determined based on the reference angle and the other angle of the next order diffracted signal using a look-up table or a grating equation-based computation. The calibration may be performed for each sweep of the OSA, at the beginning of a measurement, periodically, or on-demand.

20 Claims, 8 Drawing Sheets

(56) References Cited

U.S. PATENT DOCUMENTS 6,377,899 B1 * 4/2002 Sakai ........................ G01J 3/06
356/331
11,150,132 B2 * 10/2021 Cai ....................... G01J 3/0235
2021/0325245 A1 10/2021 Touahri et al.

* cited by examiner

300A

DIFFRACTION GRATING MONOCHROMATOR

PRIORITY

This patent application claims priority to U.S. Provisional Patent Application No. 63/393,362, entitled “DIFFRACTION GRATING MONOCHROMATOR,” filed on Jul. 29, 2022.

TECHNICAL FIELD

This patent application is directed to optical spectrum analysis, and more specifically, to a diffraction grating monochromator system that utilizes an order of reflected light beam for efficient calibration of the system.

BACKGROUND

An optical spectrum analyzer (OSA) extends the principles of spectrum analysis to the optical realm that are traditionally performed for the radio frequency (RF) spectrum by measuring important wavelength, power, and optical signal to noise ratio and other noise characteristics of light waves. OSA’s are often used for testing long haul, access networks, and data center interconnect fiber links with high channel counts, strict signal to noise requirements, and coherent technology enabling high speed transmission. For example, a fiber optic communication network utilizing wavelength division multiplexing (WDM) to allow multiple optical carrier signals to be carried over a single fiber is an example application for the use of an OSA.

Long haul networks with inline amplification rely on accurate optical power and optical signal to noise ratio measurements to ensure optimal performance, which is another testing use case of an OSA. Test solutions in the field must be capable of wavelength selective measurement to capture the key parameters for individual channels/services. A technical challenge with conventional OSAs includes obtaining optical measurements and detection with high dynamic range and high-speed detection.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
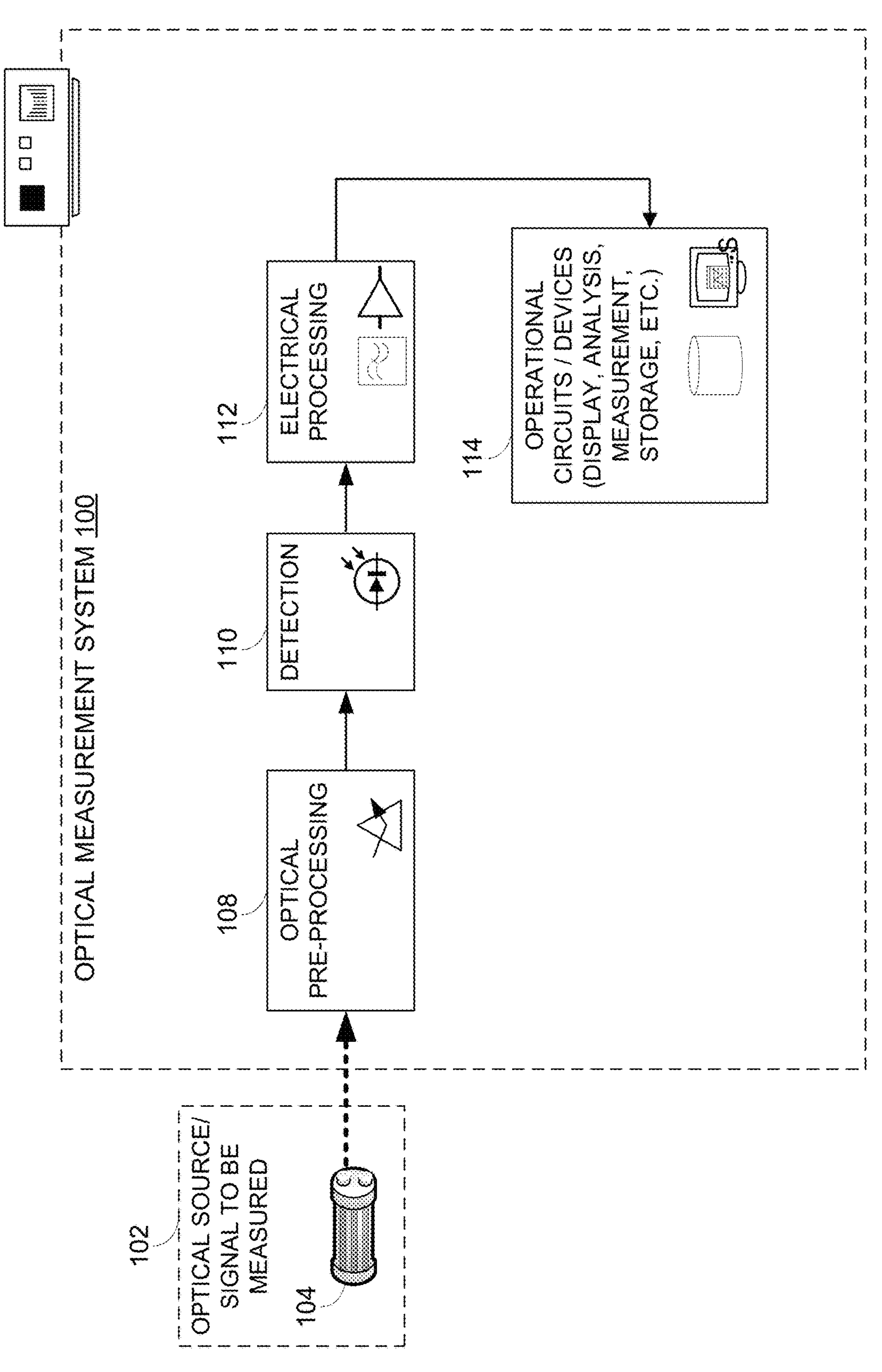
FIG. 1 illustrates a block diagram of an optical measurement system 100 with an optical input signal that may include optical pre-processing with a diffraction grating monochromator as part of its front-end, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms “a” and “an” are intended to denote at least one of a particular element, the term “includes” means includes but not limited to, the term “including” means including but not limited to, and the term “based on” means based at least in part on.

Various types of OSAs, such as Fabry-Perot-based, interferometer-based, and swept coherent heterodyne OSAs may be used in different test and monitoring environments. One of the most common OSAs for fiber-optics applications include diffraction grating based OSAs, also referred to as monochromator based OSAs.

In a monochromator based OSA, for example, a broadband light input signal may strike a diffraction grating. When this happens, a thin space between every two adjacent lines of the diffraction grating may become an independent “source,” which may then diffract light off into a range of wavelet angles. For each wavelength and each specific angle, the diffracted wavelets may be generated at exactly one wavelength out of phase with one another, and may therefore add together constructively. In other words, light with a given wavelength may leave the diffraction grating at a specific angle. Also, the wider an illuminated portion of the diffraction grating, the higher the number of diffracted wavelets there may be, and therefore the narrower the diffracted beam pattern may become. This may enable a spectral resolution of the monochromator based OSA to be proportional to the size of the illuminated portion of the diffraction grating.

According to an example of the present disclosure, a monochromator based OSA may receive an input optical signal and detect a $0^{th}$ order diffracted signal and a rotational angle of the grating at the time of detection as the grating rotates. The detected angle for the $0^{th}$ order diffracted signal is set as reference angle. The OSA may then detect a next order (e.g., $1^{st}$ order) diffracted signal and the rotational angle of the grating at the time of detection of the $1^{st}$ order diffracted signal as the grating rotates. The OSA may determine a wavelength of the next order diffracted signal based on the reference angle and the angle for the next order diffracted signal using a look-up table of diffracted signal angles and wavelengths for the particular grating or a computation based on the grating equation.

Some advantages and benefits of the systems and methods described herein are readily apparent. For example, calibration of a monochromator to detect wavelengths of various diffracted signals (different orders) may be performed during each sweep of a diffraction grating (i.e., 360-degree rotation). Thus, an additional sweep for calibration may be avoided. Furthermore, an optical signal for the calibration may be a broadband signal from any light source or obtained by splitting a portion of an input signal to be measured by an OSA, for example. Alternatively, the input signal to be measured may be used on the measurement path without an extra calibration path if the input signal’s power is sufficiently high for calibration. Thus, a secondary light source may be completely avoided. Other benefits and advantages may also be apparent.

FIG. 1 illustrates a block diagram of an optical measurement system 100 with an optical input signal that may include optical pre-processing with a diffraction grating monochromator as part of its front-end, according to an example. The optical measurement system 100 for example is a monochromator based OSA. The optical measurement system 100 may receive an optical input signal to be measured from an optical source 102, for example, a fiberoptic cable 104, and include an optical pre-processing block 108, a detection block 110, an electrical processing block 112, and operational circuits and devices 114.

In an operation, the optical input signal to be measured may be pre-processed at the optical pre-processing block 108 and provided to the detection block 110, which may include, for example, a photodiode. The detection block 110 may provide an electrical signal derived from the optical input signal to be measured to the electrical processing block 112, where the electrical signal may be amplified, filtered, up- or down-converted, converted to a digital signal, or similarly processed. The output of the electrical processing block 112 may be provided to the operational circuits and devices 114, which may include a display driver, a storage device, a digital signal processor, and other comparable circuits and devices.

In pre-processing the optical input signal, the optical measurement system 100 may select individual wavelengths for measurement. Various techniques may be used to a wavelength for measurement. One example is a diffraction grating monochromator. To determine the power for an individual wavelength, the diffraction grating method may utilize a rotating filter or "grating" inside the OSA (optical measurement system 100). Different wavelengths may be presented to a photodetector sequentially as the grating rotates. In such systems, a motor may drive the diffraction grating. For any given angle of the rotating grating, a small band of the input spectrum may be aligned with an output slit, which may be composed of an optical fiber that serves as an output coupler. In some examples, the output fiber may guide an output optical beam into a detection system (e.g., photodetector system), which may be composed of various opto-electrical elements, such as photodiodes, amplifiers, and/or analog-to-digital converters (ADCs). The detection system, among other things, may measure power as function of reflector angle, which in turn may correspond to a function of wavelength. This method is known for accommodating a wide spectral range and producing accurate readings. In some examples, the optical pre-processing block 108 may include an angle detection device, which may provide angle information to the operational circuits and devices 114 for analysis. The angle detection device may be an angle encoder or a stepper motor or any other kind of arrangement which provides an analog or digital signal from which the rotation angle of the grating or the reflector can be determined.

In some examples, the optical measurement system 100 may be a Fabry-Perot-based OSA, an interferometer-based OSA, a swept coherent heterodyne OSA, or comparable measurement system. It should be appreciated that the block diagram of the optical measurement system 100 in FIG. 1 is a block diagram showing major components of the optical measurement system 100. A measurement or similar test/monitoring system may be implemented with additional of fewer components, where certain functionality may be distributed among various components and sub-systems or performed by additional components or sub-systems using the principles described herein.

Figure 2A:
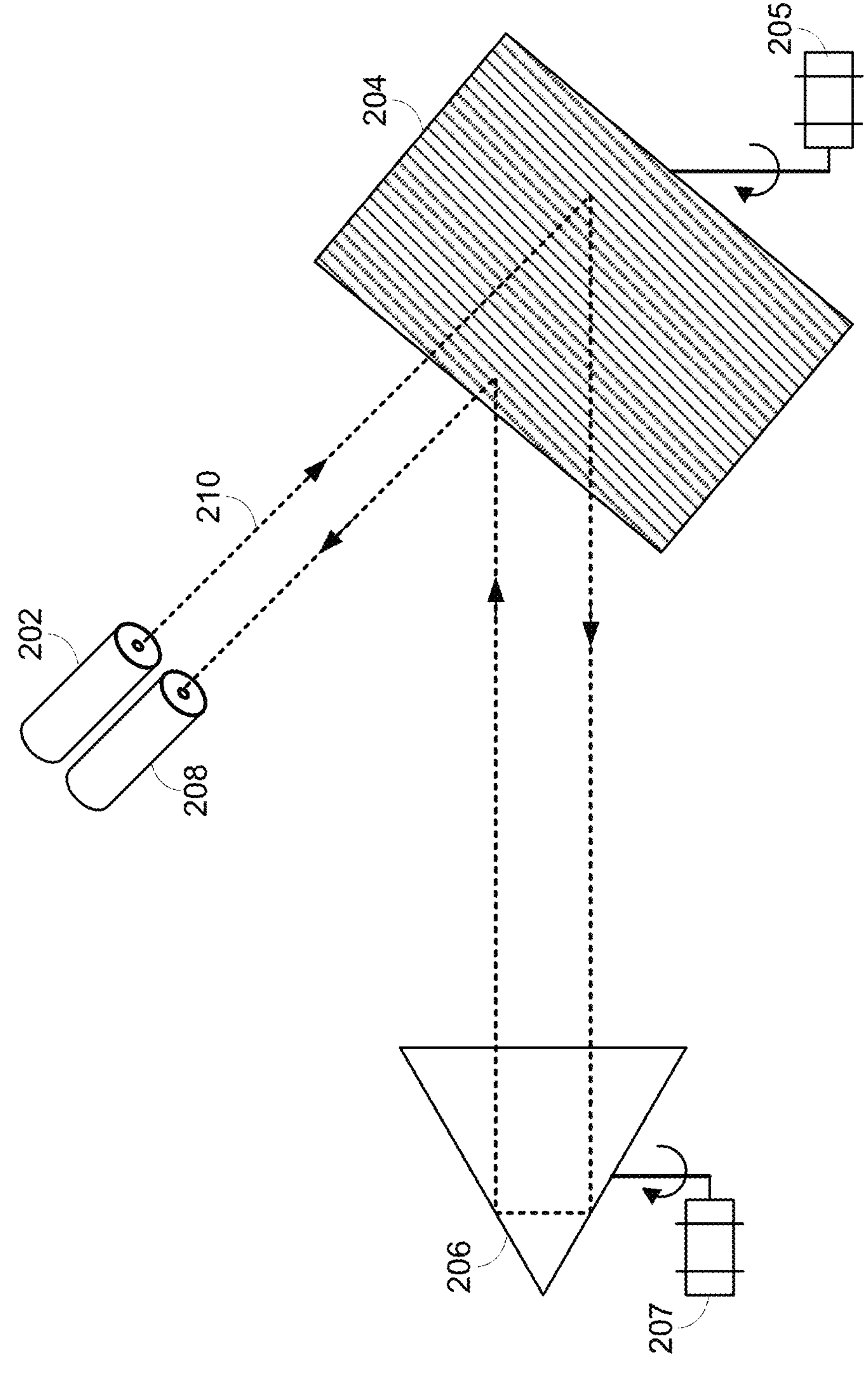
FIG. 2A illustrates diagram 200A of a diffraction grating monochromator based optical pre-processing system, according to an example.

FIG. 2A illustrates diagram 200A of a diffraction grating monochromator based optical pre-processing system, according to an example. As shown in diagram 200A, an optical signal 210 (light beam) with multiple wavelengths (e.g., a broadband beam) may be provided by an input or entrance slit 202 onto a grating 204. The optical signal 210 passing through the input or entrance slit 202 may be provided by the optical source 102 in FIG. 1. The grating 204 may diffract the optical signal 210 and provide one or more beams to a retroreflective element 206 (e.g., a prism), which may reflect the beam(s) back to the grating 204, from where further diffracted beam(s) may be provided to an output or exit slit 208. In some examples, one or both of the grating 204 and retroreflective element 206 may be rotatable. For example, the grating 204 may be rotated by a motor 205 and/or the retroreflective element 206 may be rotated by a motor 207.

It should be appreciated that one or more additional optical elements may also be provided. For example, a light source (not shown) may be provided upstream of the input or entrance slit 202 to generate the optical signal 210 (e.g., a broadband beam, white light, etc.). A detection system (not shown) may also be provided downstream of the output or exit slit 208 to collect and measure the optical signal 210. Other optical elements may also be provided. For example, one or more collimators or lenses may be provided between the input or entrance slit 202/output or exit slit 208 and the grating 204 to collimate or focus the optical signal 210 as needed.

In some examples, the grating 204 may be a diffraction grating. As such, the diffraction grating may be an optical component with a periodic structure of diffractive elements that split or diffract light into separate beams, which may be transmitted as diffracted signals and travel in different directions. In some examples, the diffraction grating may be a ruled, holographic, or other similar diffraction grating. The grating 204 may also be configured, among other things, with various properties that include transparency (transmission amplitude diffraction grating), reflectance (reflection amplitude diffraction grating), refractive index or optical path length (phase diffraction grating), and/or direction of optical axis (optical axis diffraction grating). The grating 204 may also be made from a variety of materials. This may include any number of isotropic materials. In some examples, the grating 204 to be used in optical measurement system 100 may be selected based on any number of factors to optimize a resolution of the OSA. This may include factors, such as efficiency, blaze wavelength, wavelength range, stray light, resolving power, etc.

The retroreflective element 206 may include any number of retroreflective element configurations to provide retroreflection or other similar function. For example, the retroreflective element 206 may be a prism reflector, a flat mirror, or a mirror and lens combination. In some examples, the mirror may be a convex mirror and the lens may be a focusing lens. It should be appreciated that other retroreflective elements, configurations, or combinations of such elements or configurations, may also be provided.

As shown in the diagram 200A, the optical signal 210 may travel from optical element to optical element. In this case, the optical signal 210 may pass through the same grating 204 two times between the input or entrance slit 202 and the output or exit slit 208, the multi-pass monochromator based optical spectrum analyzer of optical measurement system 100 may be referred to as a two-pass (2-pass)

monochromator based OSA that is able, by design, to achieve high resolution optical measurements. In some example, additional retroreflective elements (e.g., mirrors) may be used for a four-pass (4-pass) or higher order OSA.

Figure 2B:
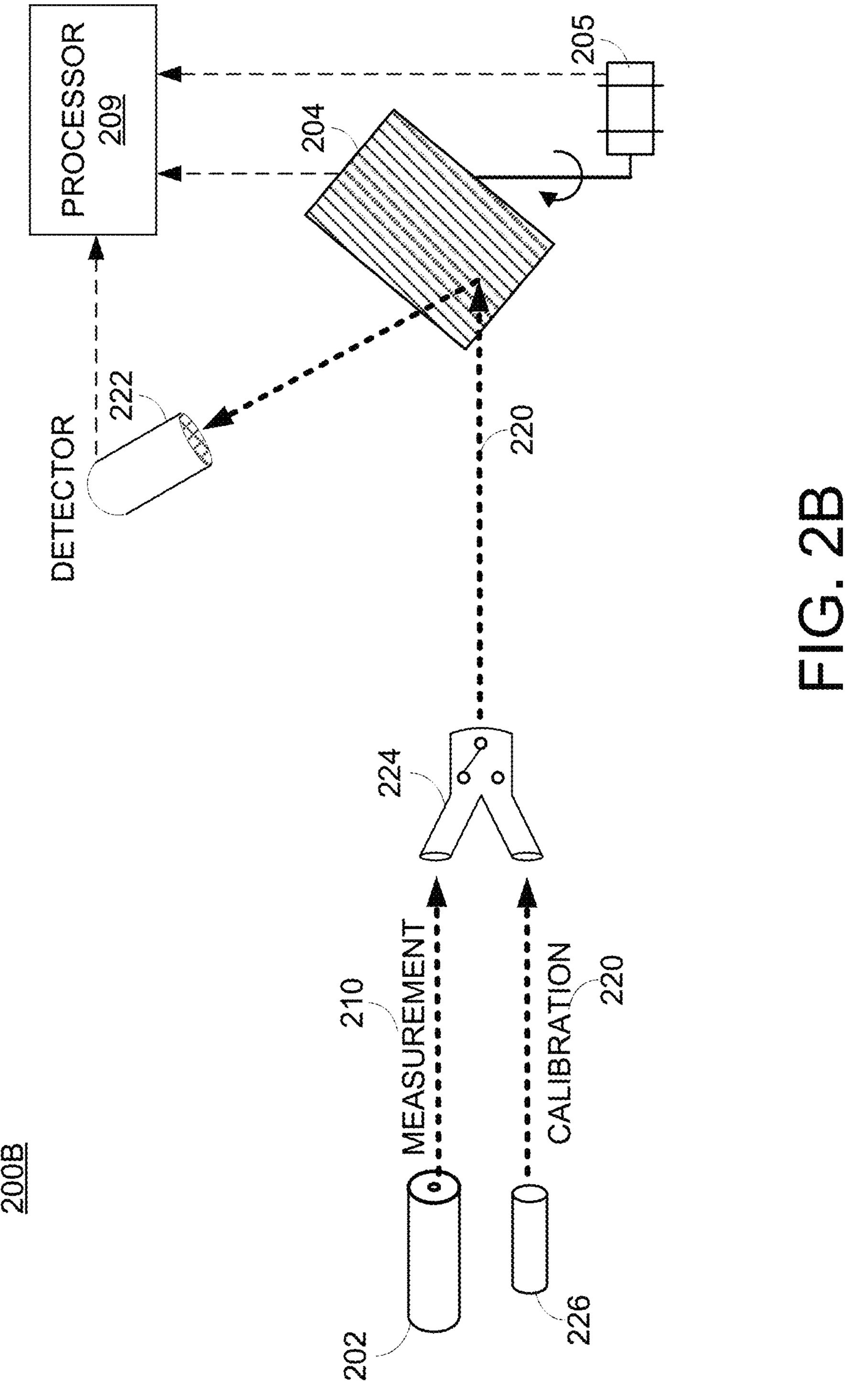
FIGS. 2B-2C illustrate diagrams 200B and 200C of calibrating a diffraction grating monochromator based optical pre-processing system, according to an example.
Figure 2C:
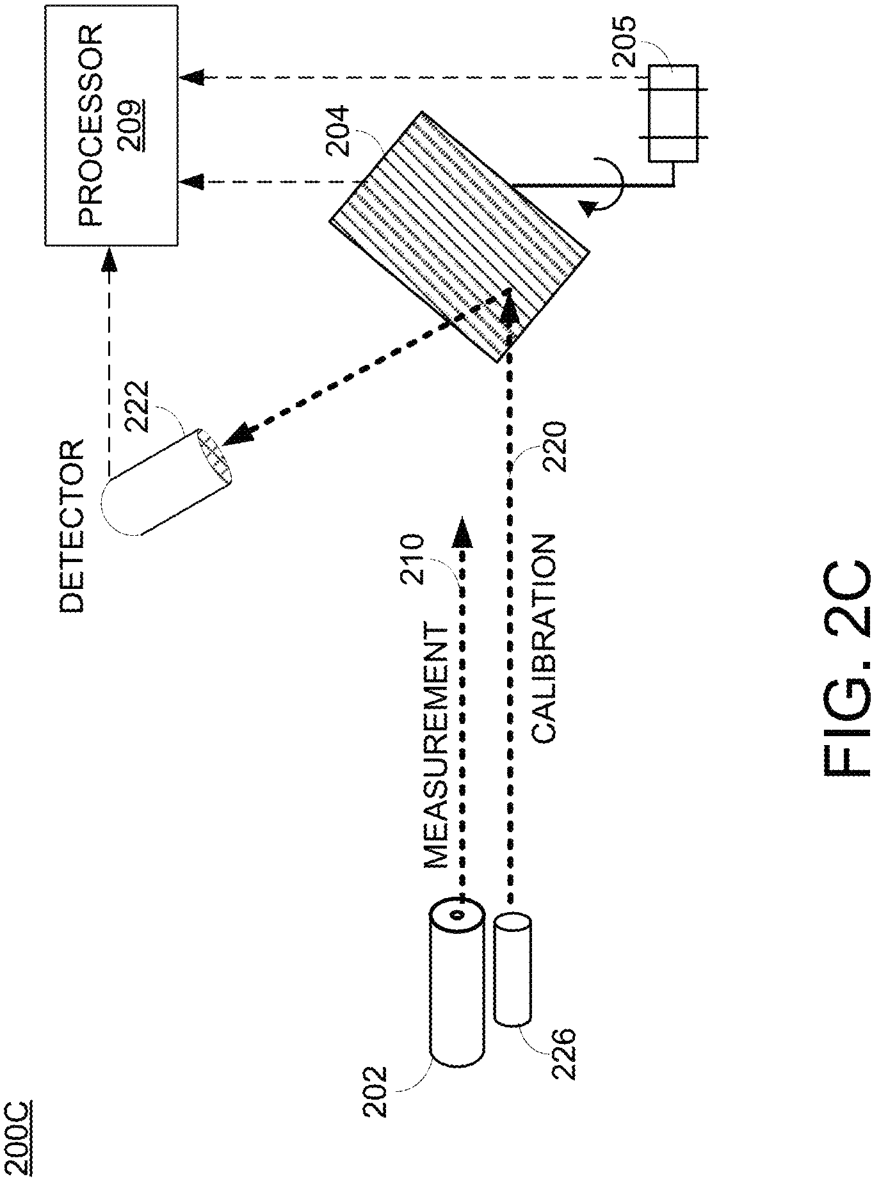

FIGS. 2B-2C illustrate diagrams 200B and 2000 of calibrating a diffraction grating monochromator based optical pre-processing system, according to an example. As shown in diagram 200B of FIG. 2B, optical signal 210 for measurement may be received from a fiber 202 and a calibration optical signal 220 may be received from another fiber 226. The measurement and calibration signals may be selected at an optical coupler 224 and provided as optical beam 220 to a grating 204 (at different times). The optical beam 220 may be diffracted by the grating 204. When the input optical signal (optical beam 220) is the measurement optical signal from the fiber 202, the diffracted beam by the grating 204 may be used for measurement purposes. When the input optical signal (optical beam 220) is the calibration optical signal from the fiber 226 (with known wavelength), it may be diffracted by the grating 204 as well and an angle of $0^{th}$ order diffraction (reflection) may be detected by a detector 222 and used as reference angle in calibrating the system.

In some examples, the detector 222 may detect the angle of each diffracted signal based on a relative angle between the detector 222 and a surface normal vector of the grating 204 or by receiving rotational angle information (at the time of detection of a diffracted signal of a particular order). For example, the rotational angle of the grating 204, when the $0^{th}$ order diffraction (reflection) is detected, is determined by the detector 222 and set as the reference angle. While the example configuration in diagram 200B (and 2000) is shown without the retroreflective element 206 in FIG. 2A, $0^{th}$ order light detection based calibration of a diffraction grating based monochromator may be performed by rotating the retroreflective element 206 instead of the grating 204, or both.

In some examples, the monochromator apparatus shown in diagram 200B (and 2000) may also include or be communicatively coupled to a processor 209. The processor 209 may receive detected diffracted signal information from the detector 222. The processor may also receive information associated with the rotational angle of the grating 204 directly from the grating 204 (e.g., through a sensor), from a motor 205 driving the grating 204, or from the detector 222. The processor 209 may set the $0^{th}$ order detection angle as reference angle and generate and/or store a table of detection angles and wavelengths for each order of diffracted signal to determine a wavelength of a diffracted signal based on the reference angle and an angle of the diffracted signal.

As shown in diagram 2000 of FIG. 2C, calibration may be performed using a separate light source (fiber 226) without an optical coupler as well. The optical signal 210 for measurement from the fiber 202 may be used for measurement through diffraction by the grating 204. The fiber 226 may provide the optical beam 220 for calibration onto the grating 204. The optical beam 220 may be diffracted by the grating 204 and an angle of $0^{th}$ order diffraction (reflection) may be detected by a detector 222 and used as reference angle in calibrating the system.

In some examples, the calibration may be performed for every sweep without affecting the measurement under both configurations (diagrams 200B and 200C). The detector 222 may be a sensor, such as a photodiode, phototransistor, or light dependent resistor. The detector 222 may be directly illuminated or the light may be transferred by a fiber or through a slit to the detector 222 allowing a very small aperture.

Figure 2D:
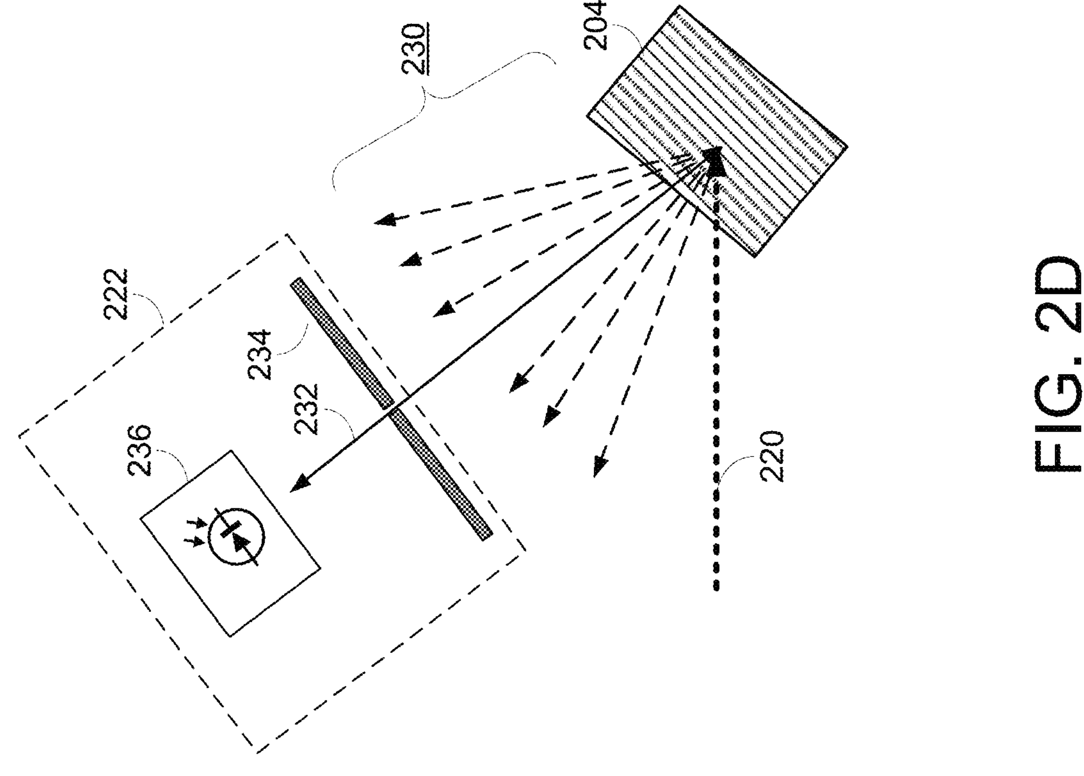
FIG. 2D illustrates diagram 200D of detection of a $0^{th}$ order wave from an incident wave onto a diffraction grating monochromator, according to an example.

FIG. 2D illustrates diagram 200D of detection of a $0^{th}$ order wave from an incident wave onto a diffraction grating monochromator, according to an example. Diagram 200D shows an incident beam such as calibration beam 220 arriving on a surface of the grating 204 and being diffracted into multiple beams 230. One of the multiple beams 230 may be the $0^{th}$ order diffraction (reflection beam 232), whose angle may be used as reference angle in a system according to examples. The detector 222, which detects the angle of the reflection beam 232 may include a slit 234 and a sensor 236.

In some examples, the detector 222 may detect the power of the optical signal at the angle where the light leaves the grating, but not directly the angle. The rotation angle of the grating may be provided by another angle encoder (e.g., the motors 205 and/or 207). The challenge is to find the angle between two light beam 232 and 220 to a precision of 0.01°. A mechanical angle encoder may measure the mechanical rotation angle of the grating from a mechanical reference point (mechanical 0°). Tolerances or thermal movements of the mounting angle of the grating (or reflector) of the prism may cause the position of the incoming beam 220, the position of the detector 222, and the mechanical reference point 0° to move relatively to one-another.

In a monochromator based OSA, for example, a broadband light (e.g., calibration beam 220) from a bright and small light source may strike a diffraction grating. When this happens, a thin space between every two adjacent lines of the diffraction grating may become an independent "source," which may then diffract light off into a range of wavelet angles (e.g., multiple beams 230). For each wavelength and each specific angle, the diffracted wavelets may be generated at exactly one wavelength out of phase with one another and may therefore add together constructively. In other words, light with a given wavelength may leave the diffraction grating at a specific angle. Also, the wider an illuminated portion of the diffraction grating, the higher the number of diffracted wavelets there may be, and therefore the narrower the diffracted beam pattern may become. This may enable a spectral resolution of the monochromator based OSA to be proportional to the size of the illuminated portion of the diffraction grating.

Different wavelengths may be presented to the sensor 236 sequentially as the grating 204 rotates. In such systems, a motor may drive the diffraction grating. For any given angle of the rotating grating, a small band of the input spectrum may be aligned with the slit 234, which may be composed of an optical fiber that serves as an output coupler, for example. The detector 222, among other things, may measure optical power as function of reflector angle, which in turn may correspond to a function of wavelength.

In some examples, a monochromator based OSA may receive an input optical signal and detect a $0^{th}$ order diffracted signal and a rotational angle of the grating at the time of detection as the grating rotates. The detected angle for the $0^{th}$ order diffracted signal may be set as reference angle. The OSA may then detect a next order (e.g., $1^{st}$) diffracted signal and the rotational angle of the grating at the time of detection of the $1^{st}$ order diffracted signal as the grating rotates. The OSA may determine a wavelength of the next order diffracted signal based on the reference angle and the angle for the next order diffracted signal.

Accordingly, the determination may be performed by checking angles and wavelengths in a look-up table or computing using the expression (2) described below. The look-up table may be generated based on the expression (2) using the grating's groove distance (d). In some examples, the prism may be rotated while the grating is stationary, or both the prism and the grating may be rotated. This wavelength/angle calibration may be performed at each sweep of wavelengths by the OSA. Alternatively, the calibration may be performed once at the beginning of a measurement, at periodic intervals, or on demand. As discussed herein, a portion of the optical signal to be measured may be used for the calibration, or a separate light source may be used to provide the calibration optical signal. Once the angle for a particular wavelength is determined, the grating may be set to that angle and the OSA may measure/analyze the input optical signal at the wavelength.

It should be appreciated that the diffraction grating based monochromator discussed herein may be implemented with various configurations using fewer or additional elements implementing the principles described herein. The configurations shown in diagrams 200A-200D are intended as illustrative examples.

Figure 3A:
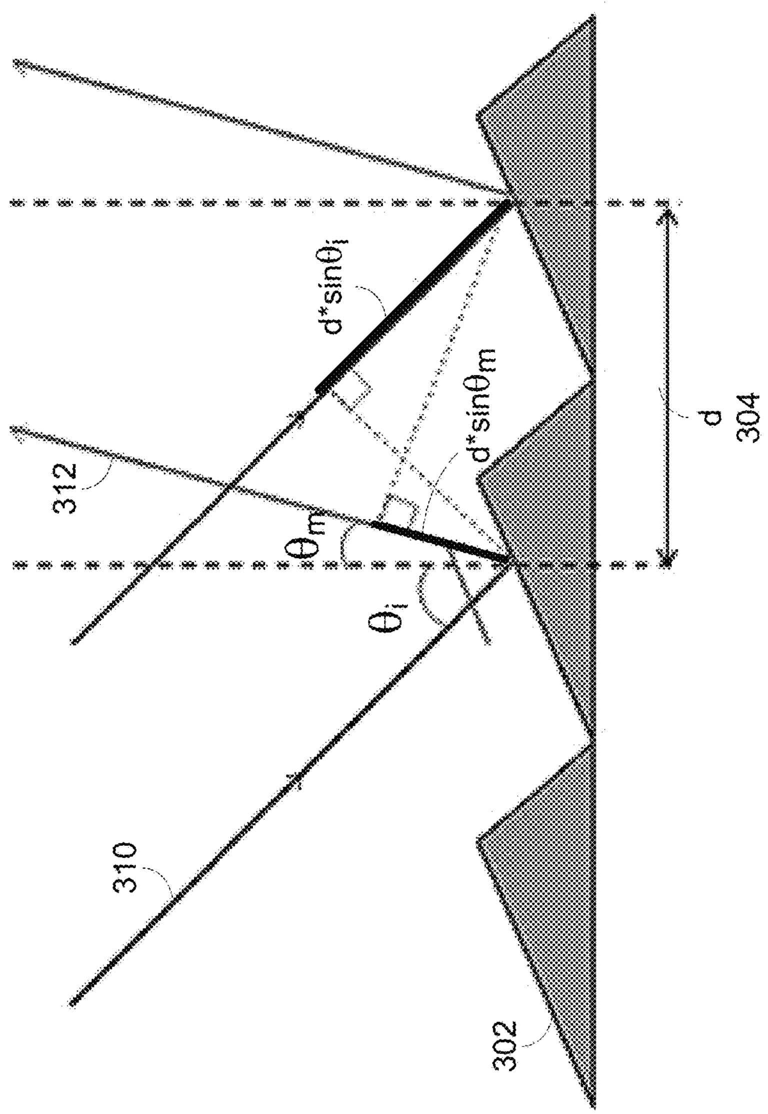
FIGS. 3A-3B illustrate diagrams 300A and 300B of diffraction of waves in a diffraction grating monochromator, according to an example.
Figure 3B:
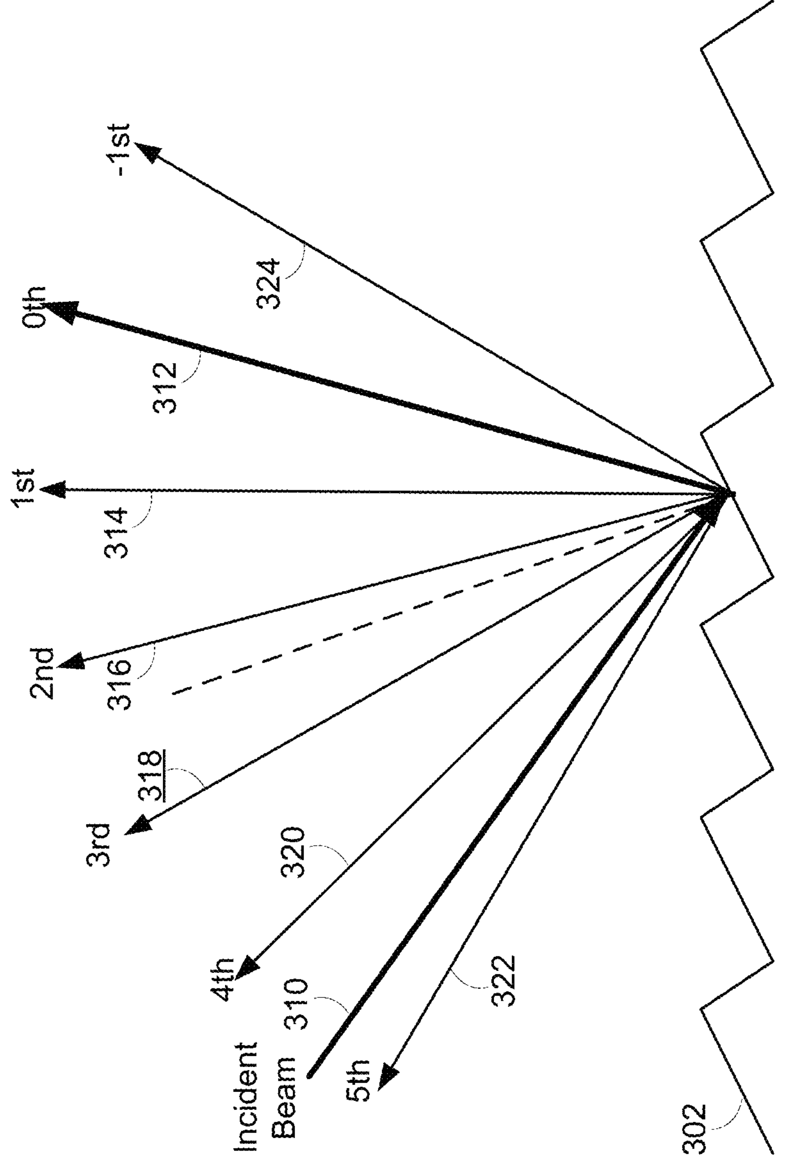

FIGS. 3A-3B illustrate diagrams 300A and 300B of diffraction of waves in a diffraction grating monochromator, according to an example. Diagram 300A in FIG. 3A shows an incident beam 310 arriving on a surface of a diffraction grating 302 and being diffracted as diffracted beam 312 with a different angle (to the grating's normal vector) than an incidence angle.

Diagram 300B in FIG. 3B shows a number of example diffracted wavelets resulting from the incident beam 310 such as $0^{th}$ order diffracted beam 312 (wavelength-independent reflection), $-1^{st}$ order diffracted beam 324, $1^{st}$ order diffracted beam 314, $2^{nd}$ order diffracted beam 316, $3^{rd}$ order diffracted beam 318, $4^{th}$ order diffracted beam 320, and $5^{th}$ order diffracted beam 322. While 6 different orders of diffracted beams are shown as an illustrative example in the diagram 300B, in practical implementations, first two or three orders (e.g., 0, 1, 2) may be utilized, as an optical power of higher order diffractions may be too low for useful detection.

The diffraction grating 302 may be an optical component with a periodic structure that separates (disperses) polychromatic light into its constituent wavelengths (colors), in other words, splits or diffracts light into separate beams that may also travel in different directions. The dispersion may arise from wavefront division and interference of incident beam from a periodic structure of the grating. The diffraction grating 302 may include equally spaced parallel grooves, formed on a reflective coating and deposited on a substrate. A shape of the grooves (i.e., blaze angle) may influence which wavelength range the grating may be optimized for. In some examples, the diffraction grating 302 may be a ruled, holographic, or other similar diffraction grating. The diffraction grating 302 may also be configured, among other things, with various properties that include transparency (transmission amplitude diffraction grating), reflectance (reflection amplitude diffraction grating), refractive index or optical path length (phase diffraction grating), and/or direction of optical axis (optical axis diffraction grating). The diffraction grating 302 may be made from a variety of materials such as any number of isotropic materials.

After an incident light beam (wave) interacts with the diffraction grating 302, the resulting diffracted light from the diffraction grating 302 may include a sum of interfering wave components emanating from each groove in the grating. At any given point in space through which the diffracted light may pass (observation point), a path length from each groove in the diffraction grating 302 may vary. Thus, a phase of the wave emanating from each of the grooves at that point may also vary. For light at a normal incidence to the diffraction grating 302, intensity maxima may occur at diffraction angles $\theta_m$, which may satisfy the expression:

$$d*\sin\theta_m = m\lambda, \tag{1}$$

where $\theta_m$ is the angle between the diffracted beam and the diffraction grating's normal vector, $\lambda$ is the wavelength, d (304) is a distance from the center of one groove to the center of another adjacent groove (i.e., periodicity distance), and m is an integer representing the propagation-mode of interest called the diffraction order.

For the incident beam 310, the with an incidence angle 61 (the angle between the incident beam 310 and the grating's normal vector), the expression (1) may be provided as:

$$\sin\theta_i + \sin\theta_m = m\lambda/d. \tag{2}$$

Thus, for $0^{th}$ order (m=0), the diffraction grating may behave like a wavelength independent mirror, where $\theta_i = \theta_m$.

In an implementation example, an OSA may utilize a diffraction grating with d=1111 nm. An operating range of the OSA may be 1250 nm to 1650 nm (covering wavelengths for single mode optical fiber transmission). The angle difference between incoming and reflected light beam may be nominally 28°. This angle may be set by mechanical design of the fiber input and the prism. The diffraction grating may rotate, as discussed herein. Thus, the incidence angle to the normal vector of the diffraction grating may be used as rotation angle. Incidence angle for all wavelengths in $0^{th}$ order (m=0) may be 14.0°, reflected at −14.0°. Incidence angle for 1250 nm in $1^{st}$ order (m=1) may be 49.5°, reflected at 21.4°, in $-1^{st}$ order (m=−1) may be −21.4°, reflected at −49.5°.

Accordingly, during a full rotation in positive angle direction, signal wavelengths of 1650 nm at −36° and 1250 nm may be seen at −21.4° in $-1^{st}$ order (m=−1). Next, any wavelength at 14° (wavelength-independent reflection) may be seen in $0^{th}$ order (m=0). Finally, the signal at 1250 nm may be seen again at 49.5° and the signal with 1650 nm at 64° in $1^{st}$ order (m=1) along with any other wavelengths between the 1250 nm and 1650 nm wavelengths. In some examples, several detectors may be used for the angle measurement. Outputs of detectors detecting the $0^{th}$ order light may be saved as reference value for 14°.

In some examples, an angle detection component without any correction may distinguish between orders which are approximately 30° apart. If light is detected around 14°+/−1°, it may be assumed as $0^{th}$ order (m=0). Corrections may be included to compensate for angle drifts (e.g., less than 0.01°). Thus, if the detected angle is not 14.00° but 14.004°, 0.004° may be subtracted from all measured angles before a table resulting from the grating equation is used to determine wavelengths.

While specific configurations such as the arrangements of a number of components (e.g., diffraction grating, prism, angle detection component) are shown in conjunction with the monochromator systems herein, the illustrated configurations are not intended to be limiting. A diffraction grating monochromator using $0^{th}$ order detection as reference for calibration may be implemented with other configurations and component values using the principles described herein.

Figure 4:
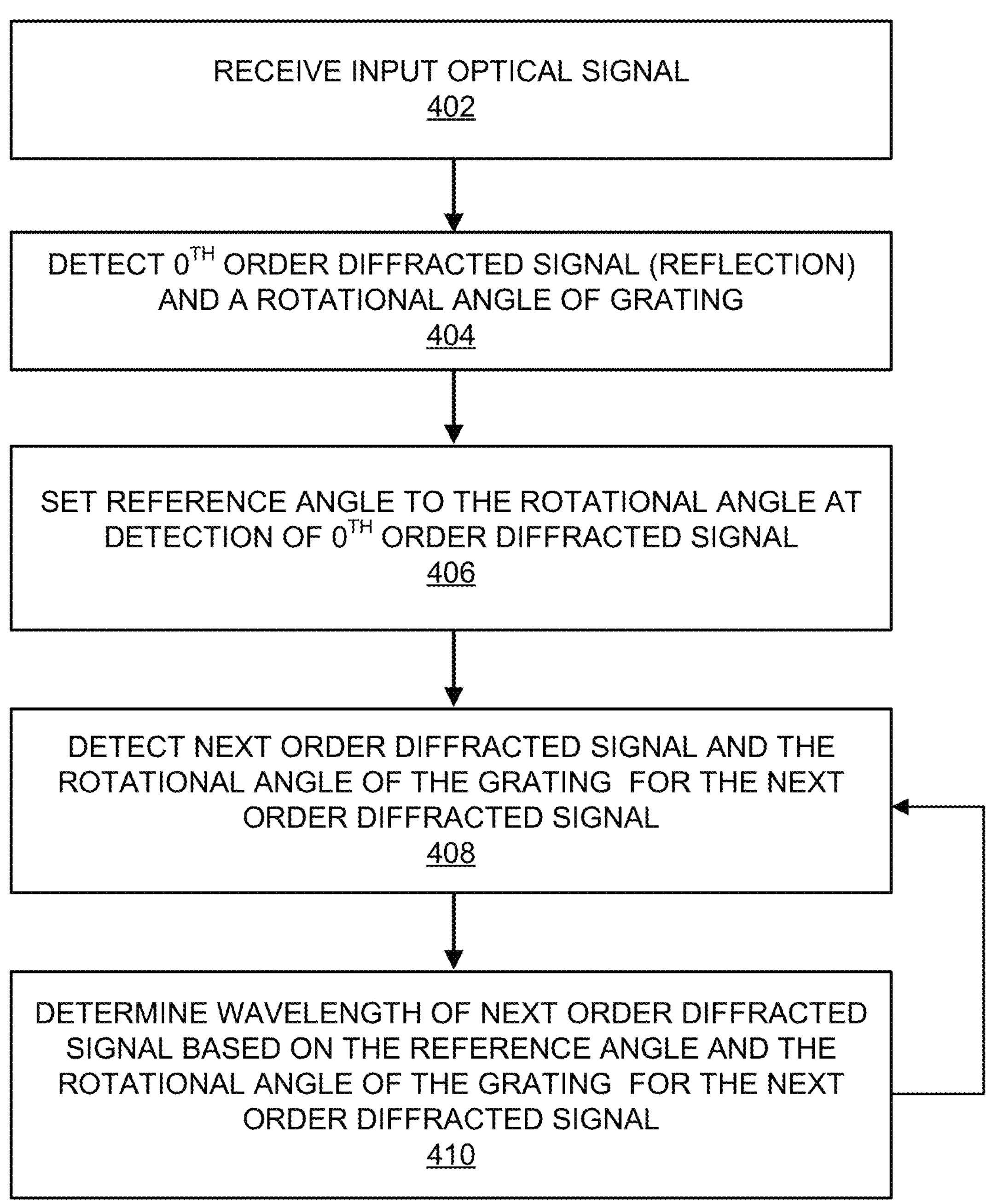
FIG. 4 illustrates a flow chart of a method for calibrating a diffraction grating monochromator in an optical measurement system, according to an example.

FIG. 4 illustrates a flow chart of a method for calibrating a diffraction grating monochromator in an optical measurement system, according to an example. The method 400 is provided by way of example, as there may be a variety of ways to carry out the method described herein. Although the method 400 is primarily described as being performed by the configurations of FIGS. 2B and 2C, the method 400 may be executed or otherwise performed by one or more processing components of another system or a combination of systems. Each block shown in FIG. 4 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 402, a monochromator based OSA (e.g., optical measurement system 100) may receive an optical signal 210 to be measured. The optical signal may be a fiberoptic cable signal, for example, and include one or more wavelengths. The optical signal 210 may be provided to a grating 204, diffracted by the grating 204, and the diffracted signals detected by an detector 222, in some examples.

At block 404, the detector 222 may detect a $0^{th}$ order diffracted signal, which is also referred to as reflected signal, as the angle for all wavelengths at the $0^{th}$ order is the same. The angle of the $0^{th}$ order diffracted signal may be determined from a rotational angle of the grating 204 when the $0^{th}$ order diffracted signal is detected.

At block 406, the rotational angle of the grating 204 for the $0^{th}$ order diffracted signal (reflection) may be set as reference angle. At block 408, a next order (e.g., $1^{st}$ order) diffracted signal may be detected. The next order diffracted signal's angle may be determined from the rotational angle of the grating 204 when the next order diffracted signal is detected.

At block 410, a wavelength of the next order diffracted signal may be determined based on a look-up table listing angles and wavelengths for different orders of diffracted signals (for the grating 204) or based on a computation using expression (2) discussed above. The detection of the next order diffracted signal and its angle may be performed iteratively for multiple diffracted signals at different angles.

According to an example, a monochromator apparatus may include a diffraction grating including a plurality of diffractive elements, where the diffraction grating may receive an optical signal having a plurality of wavelengths and transmit a plurality of diffracted signals; an detection component, which may detect one or more of the plurality of diffracted signals from the diffraction grating; and a processor communicatively coupled to the diffraction grating and the detection component. The processor may receive a rotational angle of the diffraction grating for a 0th order diffracted signal and set the rotational angle as a reference angle; receive a detected next order diffracted signal and another rotational angle of the diffraction grating for the next order diffracted signal; and determine a wavelength of the next order diffracted signal based on the reference angle and the another rotational angle of the diffraction grating for the next order diffracted signal.

According to an example, the processor may determine the wavelength of the next order diffracted signal based on a look-up table of angles of the plurality of diffracted signals and wavelengths for each of the plurality of diffracted signals. The processor may determine the wavelength of the next order diffracted signal based on a computation according to expression: $\sin\theta_i+\sin\theta_m=m\lambda/d$, where $\theta_i$ is an incidence angle of the optical signal, $\theta_m$ is an angle of the next order diffracted signal, m is an order of the next order diffracted signal, $\lambda$ is the wavelength of the next order diffracted signal, and d is a periodicity distance of the diffraction grating.

According to an example, the processor may receive the detected next order diffracted signal and the another rotational angle of the diffraction grating for the next order diffracted signal and determine the wavelength of the next order diffracted signal iteratively for a plurality of orders. The monochromator apparatus may be part of an optical spectrum analyzer (OSA). The optical signal may be obtained from an input optical signal to be measured by the OSA through a splitter. The optical signal may also be obtained from a light source distinct from an optical source providing an input optical signal to be measured by the OSA. The monochromator apparatus may further include a motor to rotate the diffraction grating, where the wavelength of the next order diffracted signal may be determined during each 360-degree rotation of the diffraction grating, at a beginning of a measurement by the OSA, periodically, or upon demand. The diffraction grating may be a transmission amplitude diffraction grating, a reflection amplitude diffraction grating, a phase diffraction grating, or an optical axis diffraction grating.

According to an example, a method for calibrating a monochromator apparatus may include receiving an optical signal; detecting a 0th order diffracted signal and an angle of the 0th order diffracted signal, where the 0th order diffracted signal may be obtained by diffracting the optical signal on a diffraction grating; setting the angle of the 0th order diffracted signal as a reference angle; detecting a next order diffracted signal and another angle of the next order diffracted signal; and determining a wavelength of the next order diffracted signal based on the reference angle and the another angle of the next order diffracted signal.

According to an example, determining the wavelength of the next order diffracted signal may include determining the wavelength of the next order diffracted signal based on a look-up table of angles of a plurality of diffracted signals and wavelengths for each of the plurality of diffracted signals associated with the diffraction grating. Determining the wavelength of the next order diffracted signal may also include determining the wavelength of the next order diffracted signal based on a computation according to expression $\sin\theta_i+\sin\theta_m=m\lambda/d$, where $\theta_i$ is an incidence angle of the optical signal, $\theta_m$ is an angle of the next order diffracted signal, m is an order of the next order diffracted signal, $\lambda$ is the wavelength of the next order diffracted signal, and d is a periodicity distance of the diffraction grating.

According to an example, the method may further include detecting the next order diffracted signal and the other angle of the next order diffracted signal and determining the wavelength of the next order diffracted signal iteratively for a plurality of orders. The monochromator apparatus may be part of an optical spectrum analyzer (OSA), and the method may further include obtaining the optical signal from an input optical signal to be measured by the OSA through a splitter. The method may also include obtaining the optical signal from a light source distinct from an optical source providing an input optical signal to be measured by the OSA. The monochromator apparatus may further include a motor to rotate the diffraction grating, and the method may further include determining the wavelength of the next order diffracted signal during each 360-degree rotation of the diffraction grating, at a beginning of a measurement, periodically, or upon demand.

According to an example, an optical spectrum analyzer (OSA) may include an optical pre-processing block, which may include a diffraction grating comprising a plurality of diffractive elements, where the diffraction grating may receive an optical signal having a plurality of wavelengths and transmit a plurality of diffracted signals; and an detection component to detect one or more of the plurality of diffracted signals from the diffraction grating; and a processor communicatively coupled to the diffraction grating and the detection component. The processor, in a calibration process, may receive a rotational angle of the diffraction grating for a 0th order diffracted signal and set the rotational angle as a reference angle; receive a detected next order diffracted signal and another rotational angle of the diffraction grating for the next order diffracted signal; and determine a wavelength of the next order diffracted signal based on the reference angle and the another rotational angle of the diffraction grating for the next order diffracted signal.

According to an example, the OSA may further include a detection block to detect an input optical signal pre-processed by the optical pre-processing block; an electrical processing block to receive an electrical signal based on the input optical signal from the detection block and to process the electrical signal; and one or more operational circuits to perform one or more of an analysis, a display, a measurement, and a storage operation on the processed electrical signal. The processor may determine the wavelength of the next order diffracted signal based on a look-up table of angles of the plurality of diffracted signals and wavelengths for each of the plurality of diffracted signals or a computation based on an incidence angle of the optical signal and the another angle of the next order diffracted signal. The optical pre-processing block may further include a motor to rotate the diffraction grating, where the wavelength of the next order diffracted signal is determined during each 360-degree rotation of the diffraction grating, at a beginning of a measurement by the OSA, periodically, or upon demand.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A monochromator apparatus, comprising:

a diffraction grating comprising a plurality of diffractive elements, the diffraction grating to receive an optical signal having a plurality of wavelengths and to transmit a plurality of diffracted signals;

a detection component to detect one or more of the plurality of diffracted signals from the diffraction grating; and a processor communicatively coupled to the diffraction grating and the detection component, the processor to:

receive a rotational angle of the diffraction grating for a $0^{th}$ order diffracted signal and set the rotational angle as a reference angle;

receive a detected next order diffracted signal and another rotational angle of the diffraction grating for the next order diffracted signal; and determine a wavelength of the next order diffracted signal based on the reference angle and the another rotational angle of the diffraction grating for the next order diffracted signal.

2. The monochromator apparatus of claim 1, wherein the processor is to determine the wavelength of the next order diffracted signal based on a look-up table of angles of the plurality of diffracted signals and wavelengths for each of the plurality of diffracted signals.

3. The monochromator apparatus of claim 1, wherein the processor is to determine the wavelength of the next order diffracted signal based on a computation according to expression:

$$\sin\theta_i+\sin\theta_m=m\lambda/d,$$

where $\theta_i$ is an incidence angle of the optical signal, $\theta_m$ is an angle of the next order diffracted signal, m is an order of the next order diffracted signal, $\lambda$ is the wavelength of the next order diffracted signal, and d is a periodicity distance of the diffraction grating.

4. The monochromator apparatus of claim 1, wherein the processor is to receive the detected next order diffracted signal and the another rotational angle of the diffraction grating for the next order diffracted signal and determine the wavelength of the next order diffracted signal iteratively for a plurality of orders.

5. The monochromator apparatus of claim 1, wherein the monochromator apparatus is part of an optical spectrum analyzer (OSA).

6. The monochromator apparatus of claim 5, wherein the optical signal is obtained from an input optical signal to be measured by the OSA through a splitter.

7. The monochromator apparatus of claim 5, wherein the optical signal is obtained from a light source distinct from an optical source providing an input optical signal to be measured by the OSA.

8. The monochromator apparatus of claim 5, further comprising:

a motor to rotate the diffraction grating, wherein the wavelength of the next order diffracted signal is determined during each 360-degree rotation of the diffraction grating, at a beginning of a measurement by the OSA, periodically, or upon demand.

9. The monochromator apparatus of claim 1, wherein the diffraction grating comprises one of a transmission amplitude diffraction grating, a reflection amplitude diffraction grating, a phase diffraction grating, or an optical axis diffraction grating.

10. A method for calibrating a monochromator apparatus, comprising:

receiving an optical signal;

detecting a $0^{th}$ order diffracted signal and an angle of the $0^{th}$ order diffracted signal, wherein the $0^{th}$ order diffracted signal is obtained by diffracting the optical signal on a diffraction grating;

setting the angle of the $0^{th}$ order diffracted signal as a reference angle;

detecting a next order diffracted signal and another angle of the next order diffracted signal; and determining a wavelength of the next order diffracted signal based on the reference angle and the another angle of the next order diffracted signal.

11. The method of claim 10, wherein determining the wavelength of the next order diffracted signal comprises:

determining the wavelength of the next order diffracted signal based on a look-up table of angles of a plurality of diffracted signals and wavelengths for each of the plurality of diffracted signals associated with the diffraction grating.

12. The method of claim 10, wherein determining the wavelength of the next order diffracted signal comprises:

determining the wavelength of the next order diffracted signal based on a computation according to expression:

$$\sin\theta_i + \sin\theta_m = m\lambda/d,$$

where $\theta_i$ is an incidence angle of the optical signal, $\theta_m$ is the another angle of the next order diffracted signal, m is an order of the next order diffracted signal, $\lambda$ is the wavelength of the next order diffracted signal, and d is a periodicity distance of the diffraction grating.

13. The method of claim 10, further comprising:

detecting the next order diffracted signal and the another angle of the next order diffracted signal and determining the wavelength of the next order diffracted signal iteratively for a plurality of orders.

14. The method of claim 10, wherein the monochromator apparatus is part of an optical spectrum analyzer (OSA), and the method further comprises:

obtaining the optical signal from an input optical signal to be measured by the OSA through a splitter.

15. The method of claim 10, wherein the monochromator apparatus is part of an optical spectrum analyzer (OSA), and the method further comprises:

obtaining the optical signal from a light source distinct from an optical source providing an input optical signal to be measured by the OSA.

16. The method of claim 10, wherein the monochromator apparatus further comprises a motor to rotate the diffraction grating, and the method further comprises:

determining the wavelength of the next order diffracted signal during each 360-degree rotation of the diffraction grating, at a beginning of a measurement, periodically, or upon demand.

17. An optical spectrum analyzer (OSA), comprising:

a diffraction grating comprising a plurality of diffractive elements, the diffraction grating to receive an optical signal having a plurality of wavelengths and to transmit a plurality of diffracted signals;

an detection component to detect one or more of the plurality of diffracted signals from the diffraction grating; and a processor communicatively coupled to the diffraction grating and the detection component, the processor, in a calibration process, to:

receive a rotational angle of the diffraction grating for a $0^{th}$ order diffracted signal and set the rotational angle as a reference angle;

receive a detected next order diffracted signal and another rotational angle of the diffraction grating for the next order diffracted signal; and determine a wavelength of the next order diffracted signal based on the reference angle and the another rotational angle of the diffraction grating for the next order diffracted signal.

18. The OSA of claim 17, wherein the optical signal is obtained from an input optical signal through a splitter.

19. The OSA of claim 17, wherein the processor is to determine the wavelength of the next order diffracted signal based on a look-up table of angles of the plurality of diffracted signals and wavelengths for each of the plurality of diffracted signals or a computation based on an incidence angle of the optical signal and the another rotational angle of the next order diffracted signal.

20. The OSA of claim 17, further comprising:

a motor to rotate the diffraction grating, wherein the wavelength of the next order diffracted signal is determined during each 360-degree rotation of the diffraction grating, at a beginning of a measurement by the OSA, periodically, or upon demand.

* * * * *